(12) United States Patent
Morandin

(10) Patent No.: US 8,797,871 B2
(45) Date of Patent: *Aug. 5, 2014

(54) TRANSMISSION CONTROL PROTOCOL (TCP) CONGESTION CONTROL USING TRANSMISSION DELAY COMPONENTS

(75) Inventor: Guglielmo M. Morandin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 12/840,206

(22) Filed: Jul. 20, 2010

(65) Prior Publication Data
US 2011/0013512 A1 Jan. 20, 2011

Related U.S. Application Data

(63) Continuation of application No. 11/291,201, filed on Nov. 30, 2005, now Pat. No. 7,760,633.

(51) Int. Cl.
| | |
|---|---|
| *G01R 31/08* | (2006.01) |
| *H04L 12/26* | (2006.01) |
| *H04J 1/16* | (2006.01) |
| *H04L 12/56* | (2006.01) |
| *H04L 1/18* | (2006.01) |
| *H04J 3/16* | (2006.01) |
| *H04J 3/22* | (2006.01) |
| *H04L 29/06* | (2006.01) |
| *H04J 3/06* | (2006.01) |

(52) U.S. Cl.
CPC .............. *H04L 47/27* (2013.01); *H04L 47/283* (2013.01); *H04L 43/0864* (2013.01); *H04L 1/187* (2013.01); *H04L 47/127* (2013.01); *H04L 69/163* (2013.01); *H04J 3/0682* (2013.01)
USPC .......................................... 370/235; 370/468

(58) Field of Classification Search
USPC .............. 370/241.1, 252–255, 229, 231, 235, 370/236, 237, 370, 431, 486, 503, 516
See application file for complete search history.

(56) References Cited

U.S. PATENT DOCUMENTS

| | | | | |
|---|---|---|---|---|
| 7,656,800 | B2 * | 2/2010 | Morandin | 370/235 |
| 7,738,505 | B2 * | 6/2010 | Chang | 370/507 |
| 7,760,633 | B2 * | 7/2010 | Morandin | 370/231 |
| 2001/0015956 | A1 * | 8/2001 | Ono | 370/229 |
| 2002/0181494 | A1 | 12/2002 | Rhee | 370/465 |

(Continued)

OTHER PUBLICATIONS

Cheng et al. "Fast TCP: Motivation, Architecture, Algorithms, Performance" *Proceedings of IEEE Infocom.* Hong Kong, Mar. 2004, pp. 2490-2501 (esp. pp. 2493-2496).

(Continued)

*Primary Examiner* — Xavier Szewai Wong
(74) *Attorney, Agent, or Firm* — Patterson & Sheridan LLP

(57) ABSTRACT

According to the present disclosure, methods and apparatus are provided to improve the Transmission Control Protocol (TCP) for data such as delay sensitive or bursty data. A maximum send window is adjusted using forward queuing delay and maximum bandwidth parameters. Reverse queuing delay and the number of packets drops are not factored into generation of the maximum send window. Network buffer occupation is bounded and a congestion window is effectively varied using rate shaping and gradual size increases based at least partially on the number acknowledged packets.

17 Claims, 5 Drawing Sheets

(56) References Cited

U.S. PATENT DOCUMENTS

| | | | |
|---|---|---|---|
| 2003/0174700 A1 | 9/2003 | Ofek et al. | 370/389 |
| 2005/0041581 A1 | 2/2005 | Kuusinen et al. | 370/230 |
| 2005/0041584 A1* | 2/2005 | Lau et al. | 370/235 |
| 2005/0083850 A1* | 4/2005 | Sin et al. | 370/252 |
| 2006/0203730 A1 | 9/2006 | Zur | 370/235 |
| 2008/0037420 A1* | 2/2008 | Tang | 370/229 |
| 2009/0285282 A1* | 11/2009 | Amir et al. | 375/240.02 |
| 2011/0116373 A1* | 5/2011 | Lauer | 370/232 |

OTHER PUBLICATIONS

PCT Search Report dated Oct. 5, 2007 from corresponding PCT Application No. PCT/US06/45702.

Cheng Jin, David X. Wei, and Steven H. Low, "Fast TCP: Motivation, Architecture, Algorithms, Performance" Aug. 2, 2004, 44 pages.

* cited by examiner

TRANSMISSION CONTROL PROTOCOL (TCP) CONGESTION CONTROL USING TRANSMISSION DELAY COMPONENTS

CROSS REFERENCE TO RELATED APPLICATIONS

This application is a continuation of U.S. patent application Ser. No. 11/291,201 filed Nov. 30, 2005 now U.S. Pat. No. 7,760,633, which is related to U.S. patent application Ser. No. 11/291,251, titled, "Methods and Apparatus for Determining Reverse Path Delay," by Guglielmo M. Morandin, now U.S. Pat. No. 7,643,430 issued Jan. 5, 2010, both of which are incorporated herein by reference.

BACKGROUND

1. Field

The present disclosure generally relates to the congestion control. More specifically, the present disclosure provides techniques and mechanisms for improving the transmission control protocol (TCP), particularly for transmitting data such as storage application data.

2. Description of Related Art

TCP provides reliability, network adaptability, congestion control and flow control. Reliability is generally provided by using mechanisms such as sequence numbers to enable retransmission. Network adaptability and flow control are generally provided by using mechanisms such as windows. A window limits the amount of data that can be transmitted onto a network.

Conventional TCP congestion control mechanisms work well for many types of data transmissions. However, conventional TCP congestion control mechanisms often do not work adequately for delay sensitive or bursty data, such as data associated with an Internet Protocol (IP) Storage Application, especially when the bandwidth, delay, and optimal window sizes of a connection are large. In one example, TCP does not work adequately for transferring data associated with Storage Area Networks (SANs). Some improvements to TCP such as FastTCP, described in "FastTCP: Motivation, Architecture, Algorithms, Performance" by Chen Jin, David Wei, and Steven Low, IEEE Infocom, March 2004, Hong Kong, address some concerns associated with TCP but still have a number of limitations.

Consequently, it is desirable to provide techniques for improving TCP to allow more effective and efficient transmission of data such as delay sensitive and bursty data, in order to greatly reduce the probability of packet drops while minimizing delay.

SUMMARY

According to the present disclosure, methods and apparatus are provided to improve the Transmission Control Protocol (TCP) for data such as delay sensitive or bursty data. A maximum send window is adjusted using forward queuing delay and maximum bandwidth parameters. Reverse queuing delay and the number of packets drops are not typically factored into generation of the maximum send window, even though recent packet drops do cause the send window to decrease. By controlling the maximum send window size using an estimate of the forward congestion delay, network buffer occupation is bounded and a congestion window is effectively varied using rate shaping. The congestion window size gradually increases based at least partially on the number of recently acknowledged bytes.

In one embodiment, a technique for performing congestion control using a transmission control protocol (TCP) is provided. A forward delay component of a round trip time associated with sending data associated with a flow from a source node and receiving an acknowledgment from a destination node is determined using the transmission control protocol (TCP). A maximum window is adjusted by using the forward delay component and an observed minimum round trip time.

In another embodiment, a network device is configured to perform congestion control using a transmission control protocol (TCP). The network device includes an interface and a processor. The interface is coupled to an Internet Protocol (IP) network. The processor is operable to determine a forward delay component of a round trip time associated with sending data associated with a flow and receiving an acknowledgment from a destination node. The destination node is connected to the interface using the transmission control protocol (TCP). The processor is also configured to adjust a maximum window by using the forward delay component and an observed minimum round trip time.

In some embodiments, when the estimated forward congestion delay increases, the window size is decreased even before any packet drop is detected.

A further understanding of the nature and advantages of the present disclosure may be realized by reference to the remaining portions of the specification and the drawings.

BRIEF DESCRIPTION OF THE DRAWINGS

The disclosure may best be understood by reference to the following description taken in conjunction with the accompanying drawings, which are illustrative of specific embodiments of the present disclosure.

DETAILED DESCRIPTION OF SPECIFIC EMBODIMENTS

Figure 1:
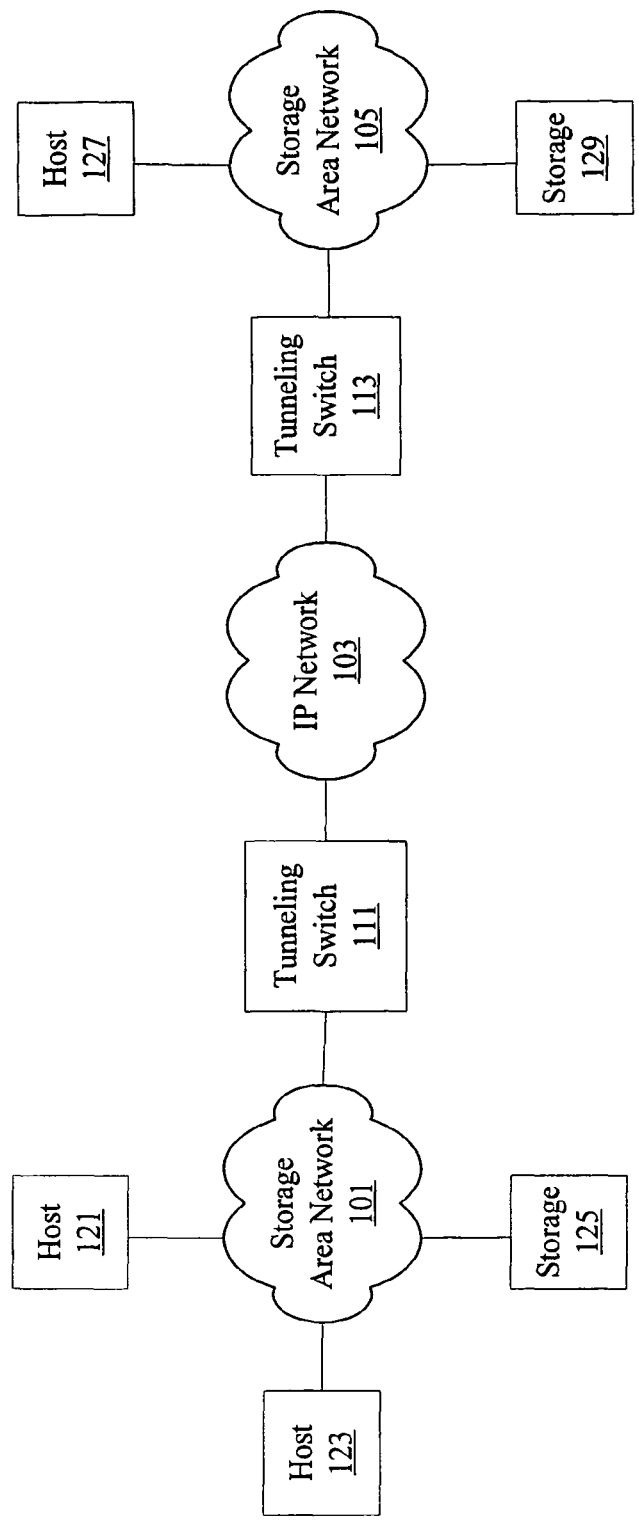
FIG. 1 is a diagrammatic representation showing network nodes that can use the techniques of the present disclosure.

Reference will now be made in detail to some specific embodiments of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications and equivalents as may be included within the spirit and scope of the disclosure as defined by the appended claims.

For example, the techniques of the present disclosure will be described in the context of the transmission control protocol (TCP). However, it should be noted that the techniques of the present disclosure can be applied to different variations and flavors of TCP as well as to alternatives to TCP and other network protocols that have a congestion control component. In the following description, numerous specific details are set forth in order to provide a thorough understanding of the present disclosure. The present disclosure may be practiced without some or all of these specific details. In other instances, well known process operations have not been described in detail in order not to unnecessarily obscure the present disclosure.

Furthermore, techniques and mechanisms of the present disclosure will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present disclosure.

The transmission control protocol (TCP) is a transport layer protocol that provides full-duplex, stream-oriented, connections allowing for reliable transmissions, network adaptation and flow control. TCP provides transmission of streams of bytes in full-duplex. Traffic flows in both the forward and reverse directions. Only during connection start and close sequences can TCP exhibit asymmetric behavior. Data transmissions are organized into different connections.

Reliability is provided using sequence numbers to track what data has been transmitted and received for each particular connection. TCP arranges for retransmission if it determines that data has been lost. Plain TCP learns about delay characteristics associated with a network and attempts to adjust its operation to maximize throughput by adjusting its retransmission timer. TCP uses 32-bit sequence numbers that identify bytes in the data stream. Each TCP packet includes the starting sequence number of the data in that packet, and the sequence number (also referred to as an acknowledgment number) of the last byte received from the remote peer. Forward and reverse sequence numbers are independent, and each TCP peer tracks both its own sequence numbering and the numbering being used by the remote peer. TCP also uses a number of flags to manage connections.

TCP provides adaptability and flow control by using windows. To avoid continuously overflowing various network buffers, TCP attempts to manage the amount of data transmitted onto a network. In typical instances, a window limits the amount of data not yet acknowledged that can be transmitted onto a network. When the window is full of data transmitted by not yet acknowledged, no other data can be sent. When an acknowledgment is received, the window slides and additional data can be sent. If no acknowledgment is received after a predetermined time out period, the oldest packet is assumed to have been lost and the data is retransmitted. Some TCP flavors use more sophisticated techniques that take advantage of the selective acknowledgement options.

In some instances, TCP varies the size of the window based on whether or not an acknowledgment is received. Any window that is varied in size based on transmission characteristics is referred to herein as a congestion window. In one example, a congestion window grows by one segment every time a positive acknowledgment is received. Consequently, the sender not only can send new data based on the acknowledgment being received but can also send new data based on the increased window size. However, the scheme is often too aggressive, as the quickly growing window size will eventually cause too much data to be transmitted onto the network and lead to packet drops. Similarly, the congestion window typically shrinks to a single segment every time the sender is idle for more than a retransmission timeout.

The congestion window then gradually grows based on successful transmissions. The congestion window grows linearly if the TCP Congestion Avoidance scheme is being used and the congestion window grows exponentially if the TCP Slow Start scheme is being used. Congestion Avoidance and Slow Start are described in RFC 2001. However, the growth of the congestion window is often slow, particularly because the congestion window shrinks to a very small size. Consequently, neither Congestion Avoidance nor Slow Start is effective for bursty data such as data from storage applications in storage area networks. The conservative growth of the congestion window may also not be suitable for delay sensitive data such as real-time video data.

Furthermore, TCP typically performs no traffic shaping of any sort. As a congestion window is growing in size, bursty traffic can be transmitted suddenly onto a network without regard to any traffic shaping parameters. Consequently, bursty traffic can end up flooding network queues and at the minimum creating unnecessary delay affecting other traffic and risking buffer overflow.

FastTCP, developed by the Networking Group led by Steven Low at CalTech, is described in "FastTCP: Motivation, Architecture, Algorithms, Performance" by Chen Jin, David Wei, and Steven Low, IEEE Infocom, March 2004, Hong Kong. FastTCP updates the maximum transmit window size using round trip times and the current value of the window. Window sizes for transmissions from a source for a particular flow are adjusted using round trip time. Packets drops are no longer considered as a primary factor in adjusting window sizes, even tough FastTCP honors the standard TCP semantics and shrinks window sizes when packet drops are detected. Round trip times provide a workable mechanism for adjusting window sizes and transmit rates.

However, the techniques of the present disclosure recognize that round trip times are sensitive to congestion happening in the forward direction from a source to a destination as well as congestion happening in the reverse direction from the destination back to the source. It is recognized that it would be preferable to consider only forward direction congestion, since forward direction congestion or forward queuing is what should affect window sizes and transmission rates from a source. Conventional TCP and FastTCP both are sensitive to reverse direction congestion. Reverse direction congestion or reverse queuing should only affect window sizes and transmission rates from other network nodes, including the peer.

FastTCP also does not put any bound on network buffer consumption. In fact, aggregate network buffer usage grows linearly with the number of FastTCP connections in a network. The techniques of the present disclosure recognize that this is not desirable because it provides that there is no upper bound to the amount of buffer required in network nodes. In the presence of a single bottleneck, all FastTCP connections congest the same queue, and if the queue length is insufficient to accommodate them, drops still occur, defeating some of the primary benefits of FastTCP.

Consequently, the techniques of the present disclosure adjust window sizes using at least the forward component of network delay. That is, forward direction delay associated with queuing for transmission from a source to a destination is considered a primary factor in adjusting window sizes. A maximum window size, as well as a congestion window size, is calculated using values associated with forward direction delay. The amount of buffer consumed in a network by a particular flow is controlled in order to limit the total amount of buffer usage. Transmission rates are also controlled using traffic shaping and managed window size changes. A variable rate shaper is used to pace packet introduction onto the network to avoid bursts, such as bursts associated with data from a disk array. The variable rate shaper maximum rate is calculated based on the maximum window size and the measured round trip time. The congestion window is controlled based on the forward component of the network delay, as opposed to the full round trip time. The amount of bottleneck buffer consumed by each connection is also controlled in order to limit the total amount of buffer usage. Buffer usage no longer grows linearly based on the number of flows.

The techniques and mechanisms of the present disclosure provide a number of improvements to conventional TCP and FastTCP. Various embodiments of the present will be referred to herein as Internet Protocol Storage (IPS) FastTCP. The techniques and mechanisms of the present disclosure provide relatively smooth traffic flow, reduced probability of packet drops and required retransmissions, reduced bottleneck queuing, and more optimal bandwidth usage. Transmission windows are not distorted by congestion on the reverse path and total buffer usage in the network is bounded. The techniques and mechanisms of the present disclosure can be applied to a variety of networks, including IP storage associated networks, where packet drops are particularly undesirable. The techniques of the present disclosure increase overall performance by reducing the probability of drops and increasing overall bandwidth usage.

FIG. 1 is a diagrammatic representation showing a network topology that can use the techniques of the present disclosure. A storage area network 101 includes hosts 121 and 123 along with storage node 125. Storage node 125 may include a disk or tape array. The storage area network 101 can also include multiple fibre channel switches. The storage area network 101 is coupled to an IP network 103 through a tunneling switch 111. Storage area network 105 includes host 127, storage 129, as well as other fibre channel switches and tunneling switch 113. The tunneling switches 111 and 113 allow the formation of a tunnel to transmit storage network data over an IP network 103.

According to various embodiments, improvements to TCP can be implemented at any source originating traffic or at any destination receiving traffic. For example, improvements to TCP can be implemented at hosts in a storage area network. In another example, improvements to TCP can be implemented at tunneling switches connecting storage area networks to an IP network. The techniques can be implemented anywhere TCP is implemented. TCP typically allows the transmission of data using windows.

Figure 2:
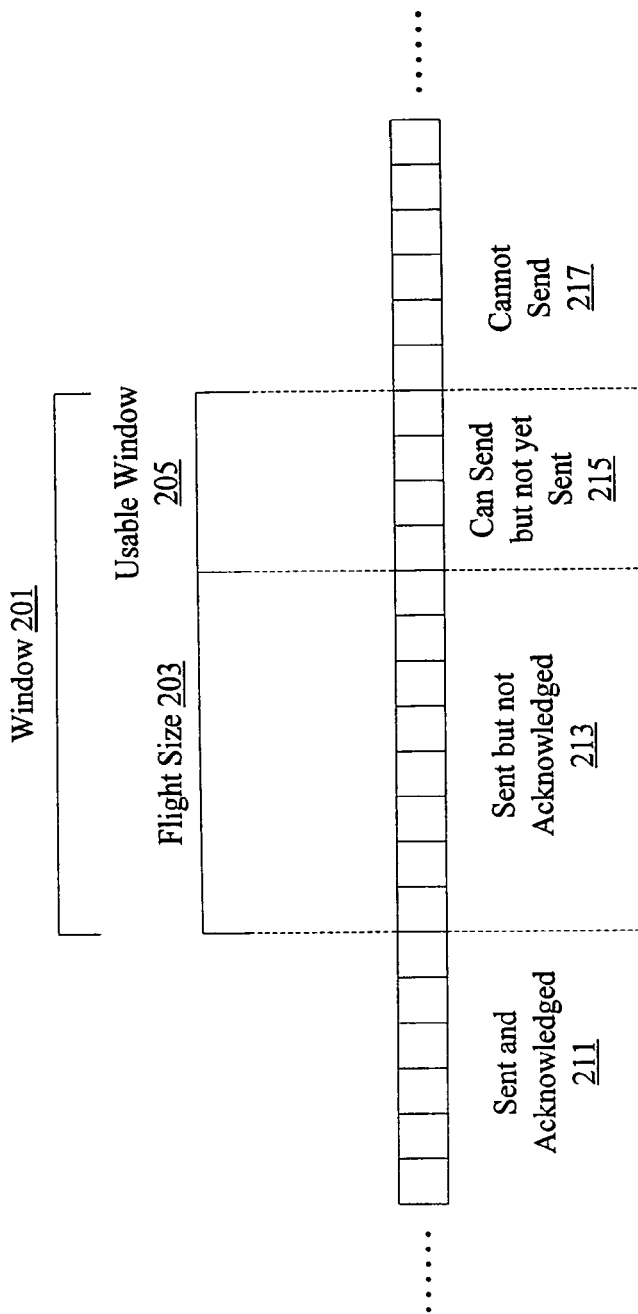
FIG. 2 is a diagrammatic representation showing a TCP transmission stream.

FIG. 2 is a diagrammatic representation showing a window. A data stream is separated into different parts. Portion 211 is data that has been sent and acknowledged. Portion 213 is data has been sent but not yet acknowledged. In some examples, this portion 213 includes data that has been retransmitted one or more times. This part is often referred to as the flight size 203. Another part of the data stream is referred to as the usable window 205. The usable window is the portion 215 that can be sent but has not yet been sent over the network.

In some examples, the usable window has a non-zero size when space is available in window 201. When the usable window 205 diminishes to nearly 0 and the flight size 203 encompasses nearly all of window 201, no additional data can be sent. The flight size 203 and the usable window 205 together are referred to as a window 201, transmission window, or congestion window. The data stream can also include data 217 that can not yet be sent over the network.

Figure 3:
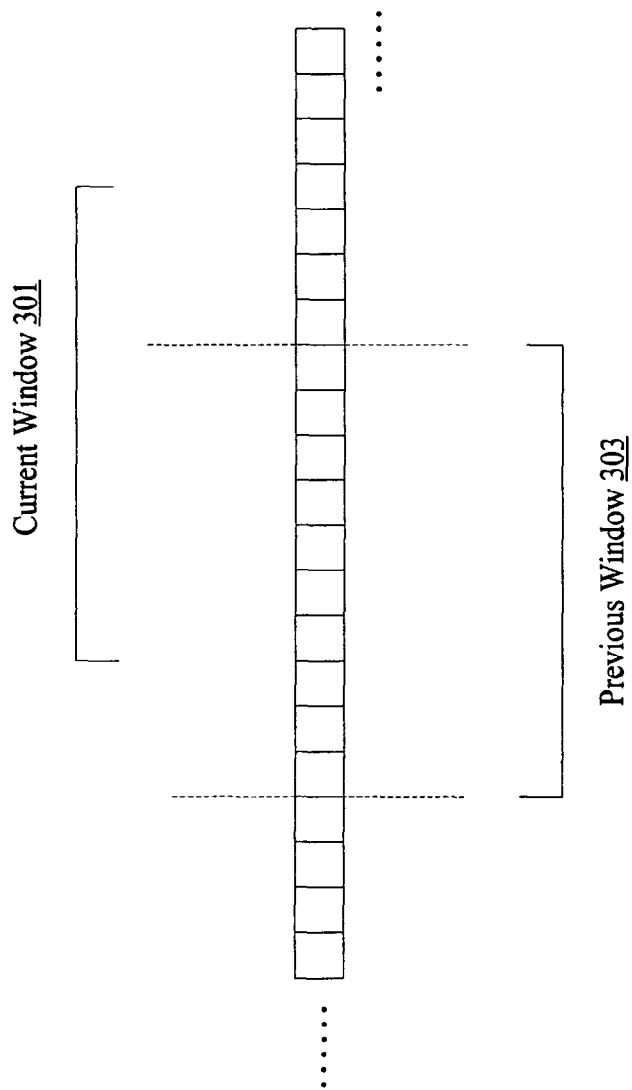
FIG. 3 is a diagrammatic representation showing a TCP sliding window.

FIG. 3 is a diagrammatic representation showing a sliding window. As data is acknowledged, a previous window 303 slides over to a current window 301 position. As data is transmitted and acknowledged, the current window continues to move to incorporate more data that has not been sent. For example, an acknowledgment may be sent for every 2 packets received by a destination. Each acknowledgment detected can shift the current window 301 over a predetermined amount. The window typically slides by the amount of data that has been acknowledged. The window typically changes size based on slow start and congestion control mechanisms.

Figure 4:
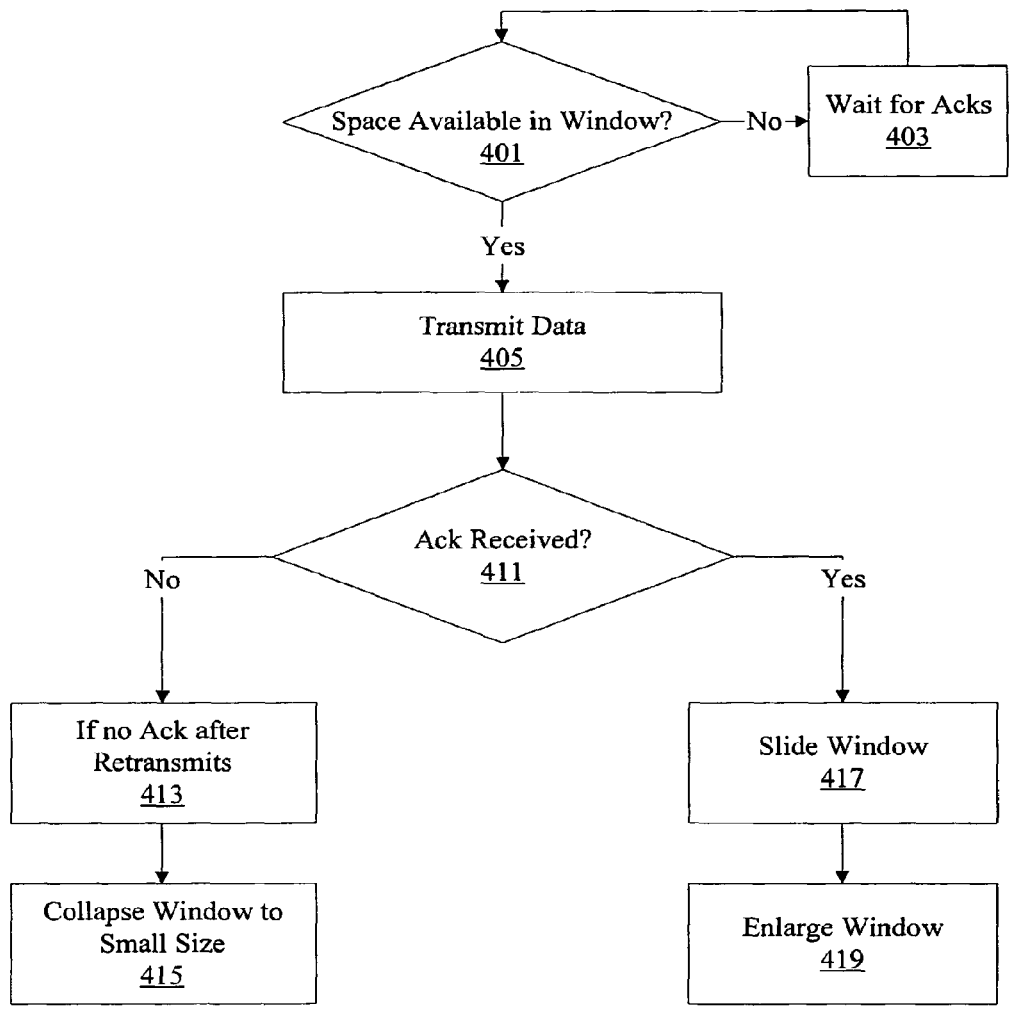
FIG. 4 is a flow process diagram showing one technique for updating a window.

FIG. 4 is a simplified flow process diagram showing a technique for adjusting a congestion window. It should be noted that the flow processes depicted herein are merely examples of techniques of the present disclosure. A variety of other techniques can also be applied. Some of the processes depicted are optional while other processes may be added while remaining within the scope of the present disclosure. In some instances, details associated with the process operations may not be described in order not to unnecessarily obscure the present disclosure.

At 401, it is determined if space is available in a window. According to various embodiments, space is available if a window is not full of data sent but not yet acknowledged. If no space is available, the sender waits for acknowledgments corresponding to sent packets or for sent packet time outs. If space is available in a window, data is transmitted 405. In one example, data is continuously transmitted as long as space is available in a window. Various counters, timers and sequence numbers can be maintained to allow for reliable retransmission. As data is transmitted, a decreasing amount of space is available in the window for transmission until acknowledgments are received.

If an acknowledgment is received at 411, the window now has more space to incorporate new data to be transmitted. In one example, if an acknowledgment is received at 411, the window slides to include new data for transmission at 417. In some instances, the window is enlarged by one segment. However, if no acknowledgment is received after one or more retransmit attempts at 413, the window is collapsed to a very small size, often to one or two segments at 415. This is often a very drastic remedy for addressing dropped packets. This is an effective solution for conventional protocols such as the file transfer protocol (FTP), which is more concerned focused towards effectively transferring a file than it is with real-time handling of bursty data.

However, the techniques of the present disclosure recognize that the window need not be adjusted as drastically. The techniques of the present disclosure provide mechanisms for intelligently adjusting the window size, based on bandwidth availability and forward delay components. According to various embodiments, a congestion window is adjusted every time TCP input is invoked. A maximum send window (snd_hiwat) is adjusted once per round trip time, after the previous window has been fully acknowledged.

FastTCP adjusts window sizes based on the delay associated with network buffering and changes the window size to the smaller of either twice the current window size or a window size modified by a control function dependent on round trip times. FastTCP adjusts window sizes using the following equation:

$$win(k) = \min\left\{2w(k-1), (1-\gamma)w(k-1) + \gamma\left(w(k-1)\frac{baseRTT}{RTT} + \alpha(w, \text{delay})\right)\right\} \quad \text{(Equation 1)}$$

$$RTT = baseRTT + \text{delay}$$

$$0 < \gamma \leq 1$$

$$\begin{cases} \text{delay} > 0 \Rightarrow \alpha(w, \text{delay}) = \tilde{\alpha} \\ \text{delay} = 0 \Rightarrow \alpha(w, \text{delay}) = aw \end{cases}$$

Once some extra delay is detected, that is, when the average RTT becomes larger than the baseRTT, the parameter α is held constant. It can be shown that on equilibrium α is the average sum of the buffer occupation for the connection. Since the metric used to determine congestion is the round trip time, FastTCP is sensitive to congestion happening in both directions of the path between two network endpoints. The TCP flows converge to a global stability point, but the configuration of flows does not necessarily maximize usage of the available bandwidth. For example, the resulting delay may all be associated with delay on the reverse path or the return path. The techniques of the present disclosure recognize that delay on the return path or the reverse path should not affect congestion window sizes.

In the presence of N FastTCP connections all using the same α, the total average buffer occupation is up to N*α. This is not desirable because it essentially implies that there is no upper bound to the amount of buffer required in network nodes, unless the max number of concurrent connections is known in advance. Even when an upper bound on the number of connections is known, the required buffer occupation might be bigger than the affordable buffer size. In the presence of common single bottleneck congestion, all the connections congest the same queue, and if the maximum queue length is insufficient to accommodate them, drops happen, thereby defeating the usefulness of FastTCP.

The forward delay component is associated with a reverse delay component and in many instances, it will be recognized that simple substitutions will allow calculation of a maximum window using forward delay components. Reverse delay can be calculated in a variety of manners. In one example, accurately synchronized source and destination nodes will allow determination of forward and reverse delays. In other examples, reverse delay can be determined using the techniques and mechanisms described in U.S. patent application Ser. No. 11/291,251, titled, "Methods and Apparatus for Determining Reverse Path Delay," by Guglielmo M. Morandin, now U.S. Pat. No. 7,643,430 issued Jan. 5, 2010, the entirety of which is incorporated by reference for all purposes.

According to various embodiments, reverse delay is calculated by maintaining accurate measurements at a source node and receiving timestamp packets from a destination node. Any packet or acknowledge including a timestamp is referred to herein as a timestamp packet. In some instances, a timestamp packet is a typical acknowledgment with timestamp information. The destination node has a timestamp speed at which timestamp packets are incremented, for example 10 ms or 1 ms. When a timestamp packet is received, it is determined whether the timestamp expected in the packet is different from the timestamp value included in the packet. In one particular example, the reverse delay is the timestamp value subtracted from the timestamp expected all divided by the timestamp speed.

The techniques and mechanisms of the present disclosure provide a maximum window that is used to adjust a congestion window. It should be noted that the maximum window is merely a target window and not necessarily an absolute maximum. According to various embodiments, the maximum window is adjusted using the forward delay component associated with a round trip time. Other factors such as an observed minimum round trip time or a maximum bandwidth can also be considered.

According to various embodiments, the maximum window is calculated using the following equation:

$$\text{snd\_hiwat}(t) = cwnd(t-1) \frac{baseRTT + rdelay(t-1)}{RTT(t-1)} + \alpha(\max\_bw, qdelay(t-1)) \quad \text{(Equation 2)}$$

$$RTT(t) = baseRTT + qdelay(t) + rdelay(t)$$

$$\begin{cases} L - \max\_bw * qdelay > 0 \Rightarrow \alpha = (L - \max\_bw * qdelay) \cdot K_p \quad 0 < K_p \le 1 \\ L - \max\_bw * qdelay \le 0 \Rightarrow \alpha = 0 \end{cases} \quad \text{(Equation 3)}$$

Equation 2 can also be rewritten in the following form:

$$\text{snd\_hiwat}(t) = cwnd(t-1) \frac{bRTT(t-1)}{bRTT(t-1) + qdelay(t-1)} + \alpha(\max\_bw, qdelay(t-1)) \quad \text{(Equation 4)}$$

$$bRTT(t) = baseRTT + rdelay(t)$$

In some examples, the maximum window is evaluated every time a current window is acknowledged. The baseRTT is used to determine the network delay associated with a network free of traffic. The techniques and mechanisms of the present disclosure recognize that congestion delay is merely one source of delay in the network. Other sources of delay include router processing and forwarding delays, source and destination delays, latency delays, etc. The techniques of the present disclosure provide mechanisms for measuring forward delay independent of baseRTT.

With the introduction of rdelay in the control equation, the techniques and mechanisms of the present disclosure are immune to congestion occurring in the reverse direction. The equilibrium point is achieved when each connection maintains α bytes queued in the forward direction.

The max_bw or maximum bandwidth is a static property of the various network nodes and link in a network and does not depend on the amount of traffic present in the network. Consequently, the max_bw can be empirically determined and/or manually configured. The value can also be estimated and autoconfigured in other examples.

The FastTCP buffer utilization is proportional to the number of active flows. However, the techniques of the present disclosure can impose an upper bound on buffer usage by using a variable α function. This avoids a significant drawback of FastTCP. The function a determines the equilibrium point for optimized distribution of network bandwidth. In general, it is desirable to reduce the value of the α function when many flows are traversing the same bottleneck buffer, and raise it again if the number of flows decreases. Unfortunately, without collaboration from the bottleneck, it is not possible to determine the number of flows. Furthermore, in general, not all the flows might be willing to send at the same rate, so a simple count of the flows would not be the best input to the α function.

Consequently, the techniques and mechanisms of the present disclosure use the forward delay component to adapt the α function. According to various embodiments, a simple proportional controller is used, although more complex controllers such as proportional integral derivative (PID) controllers can also be used. As noted above in Equation 3, given a-priori knowledge of the bottleneck bandwidth, a target buffer occupation L is compared to an estimate of the current buffer occupation obtained from the measured qdelay. An increase in qdelay is considered a consequence of increased amounts of traffic, generated by other sources, converging on the bottleneck and casing the bottleneck buffer occupation to grow. The proportional controller in Equation 3 applies negative feedback to the system, reducing α and consequently reducing the contribution of each flow to the bottleneck buffer utilization. Since the measured quantity to calculate α is the qdelay, a quantity whose average is going to be the same for all the connections sharing a single bottleneck, it is guaranteed that all these connections, on equilibrium, will tend to use the same value of α, resulting in good fairness properties.

An Additive Increase/Multiplicative Decrease (AIMD) scheme similar to the one used in conventional TCP was evaluated in order to adjust α, but it was difficult to obtain acceptable fairness. To achieve it in reasonable timescales, the rate of adjustment needs to be high, but a high rate of adjustment causes oscillations in the bottleneck queue size that can lead to packet drops.

Consequently the techniques of the present disclosure recognize that a proportional controller preferably has both good fairness and a quick response to changing network conditions. According to various embodiments the techniques of the present disclosure provide a proportional controller that allows a system to reach a stable equilibrium point in which all the connections on a bottleneck achieve the same constant throughput, not just a variable throughput whose average is the ideal one. The proportional controller also calculates a new value for every RTT and is based on the last estimate of the queuing delay. This is important to avoid drops when network conditions change, for example when a new flow activates, and to be able to consume all the available bandwidth when flows depart. In typical networks, there are usually other sources of delay besides congestion and propagation times, and in order to overcome these extra delays a minimum positive α is used to achieve full rate.

While FastTCP calculates a new congestion window every RTT, the techniques of the present disclosure recognize that it is not necessarily a good idea to immediately increase the window to the new value, because the resulting burst could cause packet drops and result in extra queuing delay that increases the measured RTT. This would occur even though the window is still smaller than the one that would be reached on equilibrium. Furthermore, bursts cause decreased performance since the increased RTT, even though temporary, limits the growth of the window towards the value it would reach at equilibrium.

Consequently, the techniques of the present disclosure reduce burstiness by applying variable rate shaping and by allowing the congestion window to grow only gradually. The packet transmission process is shaped according to the following equation:

$$\text{max\_rate} = (\text{snd\_hiwat}/\text{base\_rtt})(1+1/32) \quad \text{(Equation 5)}$$

where:
max_rate is a transmission rate;
snd_hiwat is the maximum window; and
baseRTT is the observed minimum round trip time.

Shaping is implemented by smoothly delaying packet departures in order to obtain the desired send rate. Of course new packets are sent only if they belong to the usable portion of the window.

According to various embodiments, techniques of the present disclosure not only provide more efficient and effective ways for determining congestion window sizes but also provide a variable shaper to smooth bursts of data. The shaper is programmed to a rate 1/32 faster than the average one achievable using the new target window, but still shapes at a rate close enough to the achievable rate in order to better spread the transmission of packets. The correcting factor allows full utilization of the usable window portion. According to various embodiments, shaping is important when the target window is lower than bottleneck_bandwidthrtt, i.e., below equilibrium, or in presence of other competing TCP connections. It should be noted that even if the congestion window is held constant, and the packets are initially evenly spread across the whole RTT, packets tend to cluster in time in the absence of shaping, resulting in rate variations from the average, and network buffer oscillations.

According to various embodiments, the congestion window is updated for every positive acknowledgment received. The change in the congestion window is calculated using the following equation:

$$\Delta cwnd \cong [\min(\text{snd\_hiwat} - cwnd, \alpha)]/4 \quad \text{(Equation 6)}$$

$$\begin{cases} L - \text{max\_bw} * qdelay > 0 \Rightarrow \alpha = (L - \text{max\_bw} * qdelay) \cdot K_p \quad 0 < K_p \le 1 \\ L - \text{max\_bw} * qdelay \le 0 \Rightarrow \alpha = 0 \end{cases}$$

However, the techniques and mechanisms of the present disclosure recognize that growing the congestion window using conventional TCP mechanisms is inadequate. Growth according to available TCP mechanisms is too slow and reduction is too drastic. Consequently, the techniques of the present disclosure provide for more gradual changes to congestion window sizes.

The increase in congestion window size occurring every RTT is reduced in order to dampen the window oscillation dynamics by a factor of ¼. It should be noted that a variety of reduction factors can be used, but 4 is a hardware bit shifting friendly reduction factor. Besides the reduction to ¼ of the gap between snd_hiwat and cwnd, this relation also covers scenarios after an idle period where the gap between snd_hiwat and cwnd is quite large. After an idle or partially idle period (lasting less than one rtt), snd_hiwat reflects a window used in the past and cwnd tracks the amount of data that is still pending in the network, in order to reduce burstiness. In this case, it is not desirable to grow cwnd towards snd_hiwat, since snd_hiwat does not appropriately represent the network congestion state. In such cases the cwnd is only grown by α/4.

Another corner case can happen after an IPS FastTCP failure, i.e., after a drop event and the subsequent recovery. In such a case, it is common that a large number of bytes is acknowledged by a single packet, so the number of bytes acknowledged could have a value significantly larger than normal, resulting in a sudden window growth that could cause other drops. To improve the stability of IPS FastTCP after a drop event, the number of bytes acknowledged is limited. According to various embodiments, the variable holding the number of bytes acknowledged, when used to grow the congestion window cwnd, is limited to 16000 bytes. This value has been empirically chosen, but different values might prove effective. Of course the actual value of acked is used as usual to slide the window and discard newly acknowledged data.

The above Equation 6 gives only the target cwnd growth over the next round trip time. To perform a gradual increase of cwnd, the following equations can be used:

$$\Delta actcwnd = \frac{\frac{1}{4}\min(snd\_hiwat - cwnd, \alpha)}{cwnd} \quad \text{(Equation 7)}$$

$$\begin{cases} L - \max\_bw * qdelay > 0 \Rightarrow \alpha = (L - \max\_bw * qdelay) \cdot K_p & 0 < K_p \leq 1 \\ L - \max\_bw * qdelay \leq 0 \Rightarrow \alpha = 0 \end{cases}$$

$$cwnd = cwnd + \Delta actcwnd \cdot acked \quad \text{(Equation 8)}$$

Equation 8 allows a gradual update every time a positive acknowledge is processed. However, more state information than usual needs to be kept in the TCP control block.

The techniques of the present disclosure also recognize that in some instances, the baseRTT variable may have to be recalculated. For example, the base round trip time for a particular source destination pair may change when network topology changes. One trivial case happens when the delay is decreasing. In that case it is sufficient to use the new observed RTT as the new baseRTT. A difficult case is one that results from increases in the propagation delay, because the increase could also result from network congestion. The techniques of the present disclosure recognize that the variable baseRTT should not be increased as a result of network congestion.

According to various embodiments, the TCP stack keeps track of two recently observed RTTs in order to properly update the baseRTT variable and uses the following equation:

$$baseRTT = \min(min\_rtt, prev\_min\_rtt) \quad \text{(Equation 9)}$$

where:
prev_min_rtt is the best estimate of baseRTT on a period prior to the previous 30 seconds epoch; and
min_rtt is the smallest RTT observed in the last 30 seconds epoch.

According to various embodiments, the prev_min_rtt and min_rtt are compared periodically. In some examples, the values are compared every 30 seconds. Only if min_rtt is sufficiently bigger than prev_min_rtt, the value of prev_min_rtt is min_rtt, otherwise no change is made. The rationale is that a large amount of congestion is unlikely to persist for 30 seconds, so during the 30 second interval the measured round trip time should oscillate and reach a value sufficiently close to the previously observed minimum. If instead the increased round trip time is due to a longer path, the observed RTT does not oscillate close to the old minimum, but is more likely to be exactly the new (bigger) minimum, since congestion is unlikely because all connections are trying to adapt to the longer path. In the presence of pre-existing congestion on the new path, the observed RTT will still oscillate, but will be bigger than the one measured on the old path. If the baseRTT is overestimated, drops are likely, but the subsequent path underutilization will result in a good baseRTT estimate.

In some examples, the min_rtt value can be updated using the following equations:

$$min\_rtt - prev\_min\_rtt > min\_delta \Rightarrow prev\_min\_rtt = min\_rtt \quad \text{(Equation 10)}$$

$$min\_delta = L * 4 / \max\_bw \quad \text{(Equation 11)}$$

where:
min_delta is the minimum time increase that is considered still due to congestion.

The min_rtt value can be adjusted when significant routing changes occur.

It should be noted that the techniques of the present disclosure can also be implemented by traffic destinations. In some examples, a source can control the send process of a destination by modulating windows associated with the destination. The techniques of the present disclosure can be used to pace acknowledgements to a destination so that windows at a destination can be modulated based on computations at a source.

The techniques of the present disclosure can be implemented on a variety of devices such as hosts and switches. In some examples, the improvements to TCP can be implemented at any source originating traffic or destination receiving traffic. To be effective, it does not need to be implemented on both. In other examples, the improvements to TCP can also be implemented at tunneling switches used to transmit storage application data over IP networks.

Figure 5:
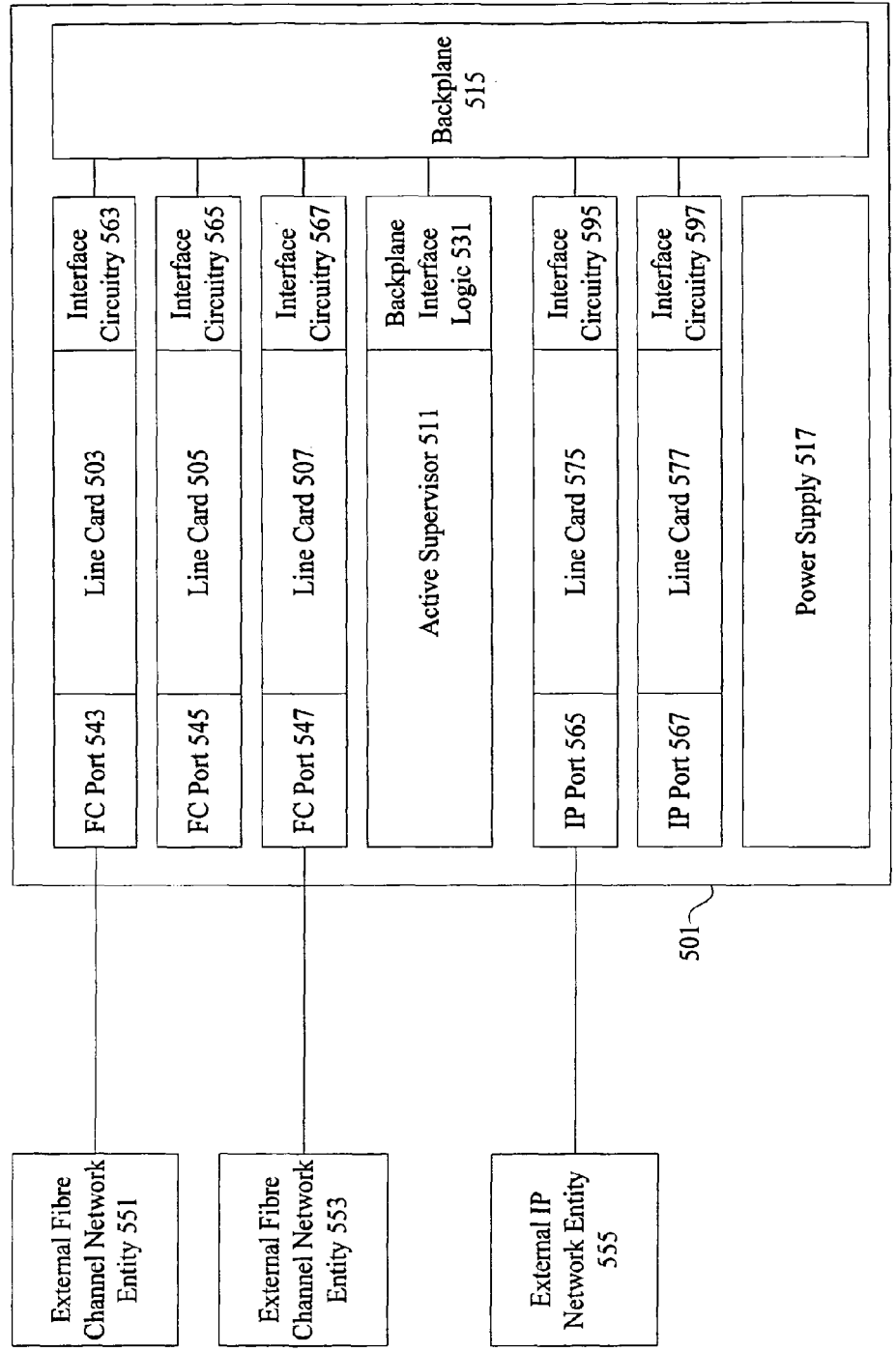
FIG. 5 is a diagrammatic representation of a device that can use the techniques of the present disclosure.

FIG. 5 is a diagrammatic representation of one example of a fibre channel switch that can be used to implement techniques of the present disclosure. Although one particular configuration will be described, it should be noted that a wide variety of switch and router configurations are available. The tunneling switch 501 may include one or more supervisors 511. According to various embodiments, the supervisor 511 has its own processor, memory and storage resources.

Line cards 503, 505, and 507 can communicate with an active supervisor 511 through interface circuitry 583, 585, and 587 and the backplane 515. According to various embodiments, each line card includes a plurality of ports that can act as either input ports or output ports for communication with external fibre channel network entities 551 and 553. The backplane 515 can provide a communications channel for all traffic between line cards and supervisors. Individual line cards 503 and 507 can also be coupled to external fibre channel network entities 551 and 553 through fibre channel ports 543 and 547.

External fibre channel network entities 551 and 553 can be nodes such as other fibre channel switches, disks, RAIDS, tape libraries or servers. It should be noted that the switch can support any number of line cards and supervisors. In the embodiment shown, only a single supervisor is connected to the backplane 515 and the single supervisor communicates with many different line cards. The active supervisor 511 may be configured or designed to run a plurality of applications such as routing, domain manager, system manager, and utility applications.

According to various embodiments, the switch also includes line cards 575 and 577 with IP interfaces 565 and 567. In one example, the IP port 565 is coupled to an external IP network entity 555. According to various embodiments, each IP line card includes a plurality of ports that can act as either input ports or output ports for communication with external IP entities 555. These IP entities could be IP switches or routers, or directly attached network endnodes. The line cards 575 and 577 can also be coupled to the backplane 515 through interface circuitry 595 and 597.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In another embodiment, a fibre channel switch performs gateway functions between hosts or disks connected to an IP network and host or disks connected to a fibre channel network. In various embodiments, the techniques of the present disclosure do not need to be implemented by both TCP end points in order to be effective.

In addition, although an exemplary switch is described, the above-described embodiments may be implemented in a variety of network devices (e.g., servers) as well as in a variety of mediums. For instance, instructions and data for implementing the above-described disclosure may be stored on a disk drive, a hard drive, a floppy disk, a server computer or a remotely networked computer. Accordingly, the present embodiments are to be considered as illustrative and not restrictive, and the disclosure is not to be limited to the details given herein, but may be modified within the scope and equivalents of the appended claims.

While the disclosure has been particularly shown and described with reference to specific embodiments thereof, it will be understood by those skilled in the art that changes in the form and details of the disclosed embodiments may be made without departing from the spirit or scope of the disclosure. For example, embodiments of the present disclosure may be employed with a variety of network protocols and architectures. It is therefore intended that the disclosure be interpreted to include all variations and equivalents that fall within the true spirit and scope of the present disclosure.

The invention claimed is:

1. A method for performing congestion control using a transmission control protocol (TCP), the method comprising:
   determining a forward delay component of a round trip time associated with sending data associated with a flow from a source node and receiving an acknowledgment from a destination node using the transmission control protocol (TCP), wherein the forward delay component specifies a delay time associated with congestion occurring in data traffic from the source node to the destination node;
   updating a previous congestion window for sending the data from the source node to the destination node, wherein the previous congestion window is updated based on an amount of data acknowledged;
   in response to updating the previous congestion window, determining a maximum window based on at least: (i) the forward delay component; (ii) a minimum round trip time observed between the source node and the destination node; (iii) the previous congestion window; (iv) a maximum bandwidth between the source node and the destination node; and (v) a target buffer amount for the flow to consume; and
   transmitting data using the maximum window.

2. The method of claim 1, wherein the maximum bandwidth is the capacity of the slowest link along the path from the source node to the destination node.

3. The method of claim 1, wherein determining the forward delay component comprises determining a reverse delay component.

4. The method of claim 1, wherein the change in the congestion window is determined using the maximum window, the previous congestion window, the forward delay component, and a maximum bandwidth.

5. The method of claim 1, wherein a variable rate shaper is used to determine a transmission rate.

6. The method of claim 5, wherein the transmission rate is determined using the maximum window and the observed minimum round trip time.

7. A network device for performing congestion control using a transmission control protocol (TCP), the network device comprising:
   an interface coupled to an Internet Protocol (IP) network; and
   a processor for determining a forward delay component of a round trip time associated with sending data associated with a flow from a source node and receiving an acknowledgment from a destination node connected to the interface using the transmission control protocol (TCP), wherein the forward delay component specifies a delay time associated with congestion occurring in data traffic from the source node to the destination node,
   wherein the processor updates a previous congestion window for sending the data from the source node to the destination node, wherein the previous congestion window is updated based on an amount of data acknowledged,
   wherein the processor, in response to updating the previous congestion window, determines a maximum window based on at least: (i) the forward delay component; (ii) a minimum round trip time observed between the source node and the destination node; (iii) the previous congestion window; (iv) a maximum bandwidth between the source node and the destination node; (v) a target buffer amount for the flow to consume,
   and wherein the processor transmits data using the maximum window.

8. The network device of claim 7, wherein the maximum bandwidth is the capacity of the slowest link along the path from the source node to the destination node.

9. The network device of claim 7, wherein determining the forward delay component comprises determining a reverse delay component.

10. The network device of claim 7, wherein the change in the congestion window is determined using the maximum window, the previous congestion window, the forward delay component, and the maximum bandwidth.

11. The network device of claim 7, wherein a variable rate shaper is used to determine a transmission rate.

12. The network device of claim 11, wherein the transmission rate is determined using the maximum window and the observed minimum round trip time.

13. A system for performing congestion control, the system comprising:
   means for determining a forward delay component of a round trip time associated with sending data associated with a flow from a source node and receiving an acknowledgment from a destination node using the transmission control protocol (TCP), wherein the forward delay component specifies a delay time associated with congestion occurring in data traffic from the source node to the destination node;
   means for updating a previous congestion window for sending the data from the source node to the destination node, wherein the previous congestion window is updated based on an amount of data acknowledged;
   means for, in response to updating the previous congestion window, determining a maximum window based on at least: (i) the forward delay component; (ii) a minimum round trip time observed between the source node and the destination node; (iii) the previous congestion window; (iv) a maximum bandwidth between the source node and the destination node; and (v) a target buffer amount for the flow to consume; and
   means for transmitting the data using the maximum window.

14. The system of claim 13, wherein determining the forward delay component comprises determining a reverse delay component.

15. The system of claim 13, wherein the change in the congestion window is determined using the maximum window, the previous congestion window, the forward delay component, and the maximum bandwidth.

16. The system of claim 13, wherein a variable rate shaper is used to determine a transmission rate.

17. The system of claim 16, wherein the transmission rate is determined using the maximum window and the observed minimum round trip time.

\* \* \* \* \*

UNITED STATES PATENT AND TRADEMARK OFFICE
CERTIFICATE OF CORRECTION

PATENT NO. : 8,797,871 B2
APPLICATION NO. : 12/840206
DATED : August 5, 2014
INVENTOR(S) : Morandin It is certified that error appears in the above-identified patent and that said Letters Patent is hereby corrected as shown below:

In the Specification

In the Detailed Description of Specific Embodiments:

Column 4, Line 27, please delete "tough" and insert -- though -- therefor;

Column 6, Line 65, please insert

-- where: w is a congestion window;
$RTT$ is the round trip time;
$baseRTT$ is the observed minimum round trip time;
$delay(t)$ is a delay associated with network queuing;
$y$ is an empirically determined control constant used to govern congestion window changes. --;

Column 8, Line 15, please insert

-- where:
$cwnd$ is a congestion window;
$snd\_hiwat$ is the maximum window;
$RTT(t)$ is the round trip time;
$baseRTT$ is the observed minimum round trip time;
$rdelay(t)$ is a reverse delay component of the round trip time;
$qdelay(t)$ is the forward delay component of the round trip time;
$L$ is a target buffer occupation;
$max\_bw$ is a maximum bandwidth; and
$K_p$ is an empirically determined proportional controller constant between 0 and 1. --;

Column 8, Line 52, please delete "a" and insert -- $\alpha$ -- therefor;

Signed and Sealed this
Ninth Day of December, 2014

Michelle K. Lee
*Deputy Director of the United States Patent and Trademark Office*

CERTIFICATE OF CORRECTION (continued)
U.S. Pat. No. 8,797,871 B2

Column 10, Line 26, please insert

-- where:
        *cwnd* is a congestion window;
        *snd_hiwat* is the maximum window;
        *qdelay(t)* is the forward delay component of the round trip time;
        *L* is a target buffer occupation;
        *max_bw* is a maximum bandwidth; and
        $K_p$ is an empirically determined proportional controller constant between 0 and 1. --.